United States Patent [19]

Dullinger

[11] Patent Number: 4,821,416
[45] Date of Patent: Apr. 18, 1989

[54] SKINNING KNIFE

[76] Inventor: Emil J. Dullinger, 35274 County Road 4, St. Joseph, Minn. 56374

[21] Appl. No.: 82,870

[22] Filed: Aug. 7, 1987

[51] Int. Cl.⁴ ............................................. B26B 29/00
[52] U.S. Cl. ........................................ 30/294; 17/66; 30/315; 30/332
[58] Field of Search ............. 30/286, 289, 294, 123.7, 30/329, 332, 335, 342, 314, 317, 315; 17/19, 21, 66, 69

[56] References Cited

U.S. PATENT DOCUMENTS

| | | | |
|---|---|---|---|
| 700,617 | 5/1902 | Cobaugh | 17/69 X |
| 2,650,424 | 9/1953 | Kalmon | 17/66 X |
| 2,880,507 | 4/1959 | Zander | 30/317 |
| 4,198,751 | 4/1981 | Egbert | 30/286 |
| 4,283,854 | 8/1981 | Austin | 30/314 |
| 4,290,201 | 9/1981 | Goodwin | 30/294 |
| 4,349,961 | 9/1982 | Pendleton | 30/342 X |

Primary Examiner—Douglas D. Watts

[57] ABSTRACT

A skinning knife for skinning game such as deer. The knife is composed of two parts which can lie flat for easy carrying and be easily assembled for use. In use, the knife comprises a cross shaped member guided by the finger tips of the user for a careful skinning process.

3 Claims, 1 Drawing Sheet

SKINNING KNIFE

BACKGROUND AND SUMMARY OF THE INVENTION

This invention pertains to knives for field skinning of certain game animals after they are downed. The knife is readily portable, and safe to carry because it is easily dissembled to be carried in a pouch. It is also particularly useful because it can be guided by the fingers of a user which are sensitive enough to guide the cut below the skin of the animal and will not be clogged by the hair on the skin of the animal.

Skinning of a game animal such as deer, antelope, moose or the like, particularly in the field, requires careful work with a knife. Most knives for skinning are adapted to cut from the outside in towards the body of the animal. Those knives can be used, but suffer from two serious shortcomings. Unless the user is extremely careful, the hair or fur on the skin of the animal is apt to become matted in front of the knife as it cuts, therefore requiring either stopping the cut for parting the hair, or attempting to cut through the matted hair. The first procedure results in constant delays in making long cuts. The second procedure may result in clear demonstration of the second shortcoming of the usual knife.

That second shortcoming is the tendency of the knife to cut through not only the skin but also the subcutaneous tissues and into the muscle of the animal resulting in unnecessary bleeding into the meat, or worse, cutting through into an organ resulting in considerable damage to the meat of the animal.

By my invention, I provide a knife which will cut from the inside out on the skin of the animal thus avoiding the problems of the usual knife, and a knife which can be more easily carried than present knives.

FIGURES

DESCRIPTION

Figure 1:
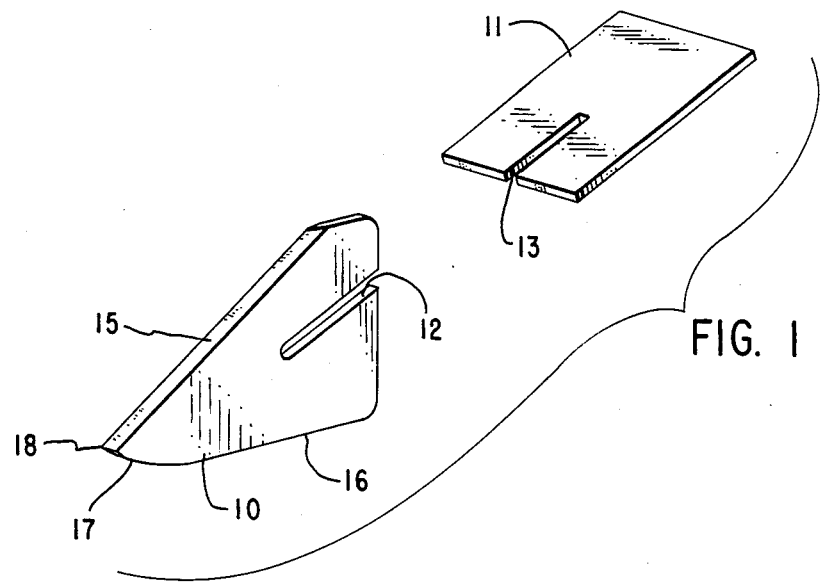
FIG. 1 is an exploded view of the knife about to be assembled.
Figure 2:
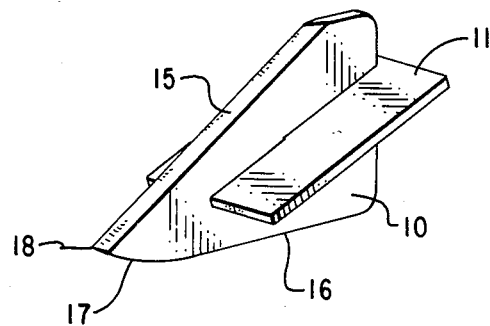
FIG. 2 is a side elevational view of the assembled knife.

Briefly my invention comprises a two piece knife device having one piece sharpened as a blade adapted to cut generally outward and a second piece comprising a vane adapted to be moved and guided by the user's fingers.

More specifically and with reference to the figures, I provide two pieces, a blade 10 and a vane 11. In each piece I form a slot adapted to embrace the other. Specifically, the blade 10 is formed with a slot 12, and the vane 11 with a slot 13. These slots 12 and 13 are adapted to embrace the opposite piece, and to fit so that the assembled knife is of cross-shape providing a vane 11 approximately perpendicular to the blade 10.

The blade is formed with a sloping, sharpened edge 15 parallel to, or nearly parallel to the vane 11. Exact parallelism is not necessary. It may even be desirable to have the vane set at a slightly lesser angle to the base 16 of the blade for ease of use of the blade. However, use of the device indicates that the vane 11 must be at some angle to the base 16 or the knife becomes very difficult to use. The base 16 near its intersection with the sharpened edge 15 is curved upwards as at 17. This formation prevents the tip 18 of the blade from cutting into tissues surrounding the skin.

In use, the knife is assembled, and a first small incision is made into the skin. The knife is held between the index finger and the adjacent middle finger of whichever is the preferred hand for the user. That will be the right hand for most people, but the knife is equally convenient for left-handed users. The sensitive inner part of the finger is adjacent the vane so that the fingernail extends downward.

The knife is then inserted into the small first incision with the sharpened part of the blade extending outwardly of the carcass. The knife can then be carefully advanced, cutting upwardly through the skin. The sensitive tips of the fingers of the user will serve to lift the skin away from the subcutaneous tissues so that the tip 18 of the knife does not cut into those tissues. The rounded portion 17 of the blade also tends to prevent such undesired cutting. Further, by cutting from inside of the carcass outwardly, the hair on the skin is never in position to be matted between the knife and the skin. Thus, the problem of matted hair is completely avoided.

After use, the knife can be washed either assembled or dissembled. Dissembly allows the two flat pieces to be slipped into a pouch for very easy storage or carrying.

Thus, I have provided a skinning knife very useful in the field because it is so readily portable and it avoids certain common problems encountered in the use of present knives.

I claim as my invention:

1. For use in skinning an animal, a knife comprising a flat blade piece having one sharpened edge and a non-cutting end and a flat vane piece, said pieces being formed with co-relative slots, each of said pieces being engaged in said slot in the opposite piece so that said vane piece extends on opposite sides of said blade piece and only slightly beyond said end of said blade piece, said pieces being readily disengageable from said slots to separate said pieces, both of said pieces being flat whereby the pieces can be placed side by side and readily carried as a flat package.

2. The knife of claim 1 in which said blade piece has a base and a sharpened edge, said edge sloping upward from said base, said co-relative slot in said blade piece lying nearly parallel to said edge, said vane member, when assembled with said blade member being thereby disposed nearly parallel to said sharpened edge.

3. The device of claim 2 in which said base intersects with said sharpened edge at a point, said base being curved toward said edge near said point.

* * * * *